(12) United States Patent
Chen et al.

(10) Patent No.: US 12,148,027 B2
(45) Date of Patent: Nov. 19, 2024

(54) DATA PROCESSING METHOD AND APPARATUS, DEVICE, AND READABLE STORAGE MEDIUM

(71) Applicant: TENCENT TECHNOLOGY (SHENZHEN) COMPANY LIMITED, Shenzhen (CN)

(72) Inventors: Hongjia Chen, Shenzhen (CN); Lingying Zeng, Shenzhen (CN); Jixuan Cai, Shenzhen (CN); Meng Cui, Shenzhen (CN); Wuxiong Zeng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 102 days.

(21) Appl. No.: 17/952,829

(22) Filed: Sep. 26, 2022

(65) Prior Publication Data

US 2023/0024345 A1 Jan. 26, 2023

Related U.S. Application Data

(63) Continuation of application No. PCT/CN2021/121724, filed on Sep. 29, 2021.

(30) Foreign Application Priority Data

Oct. 19, 2020 (CN) .......................... 202011119603.5

(51) Int. Cl.
*G06Q 40/02* (2023.01)
*G06F 9/451* (2018.01)
(Continued)

(52) U.S. Cl.
CPC ............. *G06Q 40/02* (2013.01); *G06F 9/451* (2018.02); *G06F 16/211* (2019.01);
(Continued)

(58) Field of Classification Search
CPC ....... G06Q 40/02; G06F 9/451; G06F 16/211; G06F 16/2282; G06F 16/2453;
(Continued)

(56) References Cited

U.S. PATENT DOCUMENTS

2004/0215626 A1    10/2004  Colossi et al.
2009/0210389 A1*   8/2009   Firestein ................. G06F 16/38
(Continued)

FOREIGN PATENT DOCUMENTS

CN        107402942 A       11/2017
CN        108427736 A       8/2018
(Continued)

OTHER PUBLICATIONS

International Search Report of PCT/CN2021/121724 dated Dec. 30, 2021, 9 pages.

*Primary Examiner* — Robert W Beausoliel, Jr.
*Assistant Examiner* — Mohammad S Bhuyan
(74) *Attorney, Agent, or Firm* — Banner & Witcoff, Ltd.

(57) ABSTRACT

A data processing method and apparatus, a device, and a non-transitory computer-readable storage medium are provided. A target data table is obtained that includes at least two index keywords corresponding to a target object. Metadata information corresponding to the target data table is merged to obtain a metadata management table. Feature mapping is performed on data in the target data table according to the metadata management table in order to obtain data features corresponding to the at least two index keywords in the target data table and in order to generate data feature tables. The data feature tables are merged to obtain an index table. A metadata management table is constructed through the metadata information of the target data table. An index table corresponding to the target data table is generated according to the metadata management
(Continued)

table to implement the inverted index of the data through the index table.

20 Claims, 7 Drawing Sheets

(51) Int. Cl.
*G06F 16/21* (2019.01)
*G06F 16/22* (2019.01)
*G06F 16/2453* (2019.01)
*G06F 16/2457* (2019.01)
*G06F 16/29* (2019.01)
*G06N 3/044* (2023.01)
*G06N 3/0442* (2023.01)
*G06N 3/045* (2023.01)
*G06N 3/08* (2023.01)
*G06N 20/10* (2019.01)

(52) U.S. Cl.
CPC ...... *G06F 16/2282* (2019.01); *G06F 16/2453* (2019.01); *G06N 3/044* (2023.01); *G06N 3/045* (2023.01); *G06N 3/08* (2013.01)

(58) Field of Classification Search
CPC ... G06F 16/24573; G06F 16/29; G06N 3/044; G06N 3/045; G06N 3/08; G06N 3/0442; G06N 20/10
See application file for complete search history.

(56) References Cited

U.S. PATENT DOCUMENTS

| | | | |
|---|---|---|---|
| 2011/0314026 A1* | 12/2011 | Pickens | G06F 16/33 707/E17.014 |
| 2013/0246431 A1* | 9/2013 | Ahuja | G06F 16/358 707/E17.089 |
| 2013/0262471 A1 | 10/2013 | Whitman et al. | |
| 2014/0095253 A1* | 4/2014 | Demele | G06Q 10/10 705/7.29 |
| 2017/0193041 A1* | 7/2017 | Fuchs | G06F 16/21 |

FOREIGN PATENT DOCUMENTS

| | | |
|---|---|---|
| CN | 111488340 A | 8/2020 |
| CN | 111782663 A | 10/2020 |

* cited by examiner

DATA PROCESSING METHOD AND APPARATUS, DEVICE, AND READABLE STORAGE MEDIUM

RELATED APPLICATION

This application is a continuation of PCT application PCT/CN2021/121724, which claims priority to Chinese Patent Application No. 202011119603.5, entitled "DATA PROCESSING METHOD AND APPARATUS, DEVICE, AND READABLE STORAGE MEDIUM," which was filed with the China National Intellectual Property Administration on Oct. 19, 2020 and is incorporated herein by reference in its entirety.

FIELD OF THE TECHNOLOGY

Examples of the present subject matter relate to the field of data processing, and in particular, to a data processing method and apparatus, a device, and a non-transitory computer-readable storage medium.

BACKGROUND OF THE DISCLOSURE

In the field of data processing, a description may be generated using an index process of user portrait data as an example. The user portrait data may be stored in a plurality of data tables with different storage dimensions. For example, a user historical browsing data table may be used for storing browsing data of the user in over a historical time period, a user interest portrait data table may be used for storing interest tags of the user, a user basic information table may be used for storing basic information of the user, or the like. In a case where the index process may be performed on the user portrait data when at least two index keywords are included, there may be a case of crossover query.

In the related art, original table data may be stored in a data warehouse tool, and then a target portrait field may be queried by executing a related analysis query statement, such as a structured query language (SQL) statement, to obtain corresponding user portrait data by querying.

However, a multi-dimensional crossover query often may involve writing complex SQL logic expressions and may also involve querying a large quantity of data tables, resulting in a long query time and low data index efficiency.

SUMMARY

Examples of the present subject matter provide a data processing method and apparatus, a device, and a non-transitory computer-readable storage medium, which may improve the data index efficiency. The technical solutions are as follows:

According to one aspect, a data processing method is provided, for a computer device, the method including: obtaining a target data table, the target data table including at least two index keywords corresponding to a target object; merging metadata information corresponding to the at least two index keywords in the target data table to obtain a metadata management table; performing feature mapping on data in the target data table according to the metadata management table to obtain data features corresponding to the at least two index keywords in the target data table, and generate data feature tables; and merging the data feature tables to obtain an index table, the index table being used for correspondingly storing the target object and a data feature corresponding to the target object.

According to another aspect, a data processing apparatus is provided, the apparatus including: an obtaining module, configured to obtain a target data table, the target data table including at least two index keywords corresponding to a target object; a merging module, configured to merge metadata information corresponding to the at least two index keywords in the target data table to obtain a metadata management table; a mapping module, configured to perform feature mapping on data in the target data table according to the metadata management table to obtain data features corresponding to the at least two index keywords in the target data table, and generate data feature tables; and the merging module being further configured to merge the data feature tables to obtain an index table, the index table being used for correspondingly storing the target object and a data feature corresponding to the target object.

In an optional example, the merging module includes: a determining unit, configured to determine basic metadata information corresponding to the at least two index keywords in the target data table to obtain a basic field information table; and a generation unit, configured to generate other metadata information tables according to the at least two index keywords in the target data table with the basic field information table as a core to obtain the metadata management table, where the other metadata information tables are used for indicating index related information corresponding to the at least two index keywords.

In an optional example, the generation unit is further configured to generate a data theme table corresponding to the at least two index keywords with the basic field information table as the core; and link a theme field foreign key in the basic field information table to the data theme table, where the data theme table is used for indicating a theme relationship corresponding to the at least two index keywords; or the generation unit is further configured to generate a metadata information table corresponding to the at least two index keywords with the basic field information table as the core; and link a table field foreign key in the basic field information table to the metadata information table, where the metadata information table is used for indicating the metadata information corresponding to the at least two index keywords; or the generation unit is further configured to generate a metadata information management table corresponding to the at least two index keywords with the basic field information table as the core; and link a data type field foreign key in the basic field information table to the metadata information management tables, where the metadata information management table includes a data type and a value range corresponding to each of the at least two index keywords.

In an optional example, the determining unit is further configured to determine the metadata management table according to a foreign key link relationship between fields in the basic field information table and the other metadata information tables.

In an optional example, the determining unit is further configured to obtain the basic metadata information corresponding to the at least two index keywords in the target data table, where the basic metadata information is used for describing basic external link information corresponding to the at least two index keywords; and use the basic metadata information as field information to construct basic field information table corresponding to the at least two index keywords.

In an optional example, the target data table includes classification data corresponding to the at least two index keywords; and the mapping module is further configured to map the classification data in the target data table to value ranges corresponding to classification types according to the metadata management table to obtain feature values corresponding to the classification data as the data features.

In an optional example, the target data table includes location service data corresponding to the at least two index keywords; and the mapping module is further configured to divide preset map data into n grids according to the metadata management table, where n is a positive integer; label the n grids with corresponding grid identifiers; and map the location service data into the grids, to obtain grid identifiers of the location service data as the data features.

In an optional example, the merging module is further configured to horizontally splice, in response to that the data feature tables include wide table features, the wide table features corresponding to the at least two index keywords to obtain a wide table; in response to that the data feature tables include vertical table features, sequentially write value range fields in the vertical table features corresponding to the at least two index keywords in a value range storage unit, and sequentially write field setting values in the vertical table features in a field storage unit to obtain a vertical table; and the merging module is further configured to merge the wide table and the vertical table to obtain the index table.

In an optional example, the merging module is further configured to horizontally splice the wide table and the vertical table to obtain the index table.

In an optional example, the apparatus further includes: a receiving module, configured to receive an index request, where the index request includes a keyword requirement corresponding to the at least two index keywords; the obtaining module, further configured to obtain a target object whose data feature meets the keyword requirement from the index table as an index result; and a transmission module, configured to return the index result.

In an optional example, the obtaining module is further configured to determine a feature requirement corresponding to the keyword requirement, where the feature requirement is used for expressing the keyword requirement in a feature form; and obtain an object whose data feature meets the feature requirement from the index table as the index result.

In an optional example, the obtaining module is further configured to obtain at least two target data tables, where the at least two index keywords corresponding to the target object are distributed in the at least two target data tables.

According to another aspect, a computer device is provided, including a processor and a memory, the memory storing at least one instruction, at least one segment of program, a code set, or an instruction set, the at least one instruction, the at least one segment of program, the code set, or the instruction set being loaded and executed by the processor to implement the data processing method according to any one of the foregoing examples of the present subject matter.

According to another aspect, a non-transitory computer-readable storage medium is provided, storing at least one instruction, at least one segment of program, a code set, or an instruction set, the at least one instruction, the at least one segment of program, the code set, or the instruction set being loaded and executed by a processor to implement the data processing method according to any one of the foregoing examples of the present subject matter.

According to another aspect, a computer program product or a computer program is provided, the computer program product or the computer program including computer instructions, the computer instructions being stored in a non-transitory computer-readable storage medium. A processor of a computer device reads the computer instructions from the non-transitory computer-readable storage medium, and executes the computer instructions, to cause the computer device to implement the foregoing data processing method according to any one of the foregoing examples of the present subject matter.

The technical solutions provided in the examples of the present subject matter produce at least the following beneficial effects. A metadata management table may be constructed through the metadata information of the target data table, and an index table corresponding to the target data table may be generated according to the metadata management table, thereby implementing the inverted index of the data through the index table, improving the crossover query efficiency of different types of data, and reducing the time required for performing the index query on the data.

BRIEF DESCRIPTION OF THE DRAWINGS

To describe the technical solutions in the examples of the present subject matter more clearly, the following briefly introduces the accompanying drawings required for describing the examples. Apparently, the accompanying drawings in the following description show only some examples of the present subject matter, and a person of ordinary skill in the art may still derive other accompanying drawings from the accompanying drawings without creative efforts.

DETAILED DESCRIPTION

Figure 1:
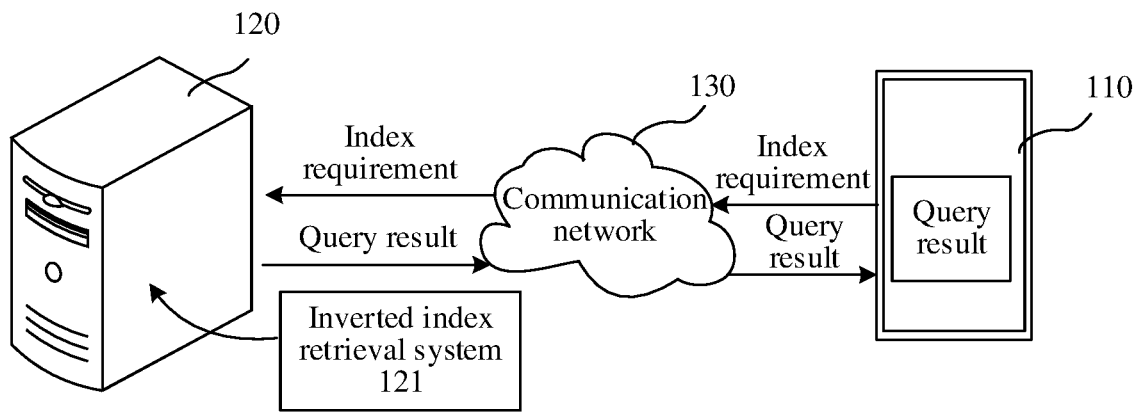
FIG. 1 is a schematic diagram of an implementation environment according to an example of the present subject matter.

To make the objectives, technical solutions, and advantages of the present subject matter clearer, the following further describes implementations of the present subject matter in detail with reference to the accompanying drawings.

As used herein, data index refers to performing index on data corresponding to an index keyword in a data table, which is classified into positive index and inverted index. In this example of the present subject matter, the introduction mainly focuses on the inverted index.

As used herein, an inverted index refers to an index manner for searching records according to a value of an attribute. For example, according to a gender attribute requirement of female, and an academic credential attribute requirement of master's degree, a user who meets the gender attribute requirement and academic credential attribute requirement is found through the inverted index. Each item in the index table includes an attribute value and an address of each record with the attribute value. The attribute value may not be determined by the record, a location of the record is determined by the attribute value, and consequently is referred to as the inverted index. On the contrary, the positive index refers to determining information corresponding to the user in an index table through a user identifier, for example, determining name, gender, age, interest tag, and historical browsing data corresponding to the user whose user identifier is 001.

A description is made by using user portrait data as an example, in the related art, a portrait system is usually constructed in the following manner.

Original table data may be stored in a data warehouse tool, and then a target portrait field may be queried by executing the related query statement. The type of portrait system can support simple query manners such as SQL, but query crossover dimension of the portrait system can only support dimension crossover within a specified quantity. Multi-dimensional crossover often involves complex SQL logic expression writing, and may involve a large quantity of table queries, resulting in long query time.

In accordance with the present subject matter, a retrieval system based on the inverted index may be provided, which may construct a portrait system that can support multimodal crossover query, and may simultaneously process crossover query of different types of data such as latitude and longitude data, text data, and numerical data.

The data may be stored in a physical server or in a cloud server.

The cloud technology may be a hosting technology that unifies a series of resources such as hardware, software, and networks in a wide area network or a local area network to implement computing, storage, processing, and sharing of data. The cloud technology may be a collective name of a network technology, an information technology, an integration technology, a management platform technology, an application technology, and the like based on an application of a cloud computing business mode, and may form a resource pool, which may be used as required, and may be flexible and convenient. A backend service of a technical network system requires a large amount of computing and storage resources. For example, during quality inspection of a dual-recorded video, the dual-recorded video needs to be stored and artificial intelligence (AI) computing needs to be performed on different key video segments in the dual-recorded video. As the Internet industry is highly developed and applied, each article may have its own identifier in the future and needs to be transmitted to a background system for logical processing. Data at different levels may be separately processed, and data in various industries requires strong system support, which can only be implemented through cloud computing.

Cloud storage is a new concept developed based on the concept of cloud computing. A distributed cloud storage system (abbreviated as a storage system below) may be a storage system that combines many different types of storage devices (storage devices are also referred to as storage nodes) in a network through application software or an application interface based on cluster application, a grid technology, a distributed storage file system, and other functions, so that the storage devices work in coordination with each other to jointly provide data storage and service access functions to the outside.

FIG. 1 is a schematic diagram of an implementation environment according to an example of the present subject matter. As shown in FIG. 1, the implementation environment includes a terminal 110, a server 120, and a communication network 130.

A data query interface may be displayed in the terminal 110, which includes a plurality of index keywords. After setting requirements for at least two index keywords among the plurality of index keywords through the terminal 110, the user transmits an index request to the server 120 through a communication network 130. The index request includes index requirements set for the at least two keywords.

The server 120 includes an inverted index retrieval system 121 corresponding to at least one data table, where the inverted index retrieval system 121 includes an index table obtained by reintegrating the data tables according to metadata of a plurality of data tables. After receiving the index request transmitted by the terminal 110, the server 120 performs query on an object that meets the index requirements in the index system, and returns a query result to the terminal 110 through the communication network 130 for display.

The terminal 110 includes at least one of a smart phone, a tablet computer, a portable laptop computer, a desktop computer, a smart speaker, a smart portable device, and an in-vehicle terminal.

The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

In some examples, the server may also be implemented as a node in a blockchain system. A blockchain is a new application mode of computer technologies such as distributed data storage, point-to-point transmission, a consensus mechanism, and an encryption algorithm. The blockchain may be essentially a decentralized database and may be a string of data blocks generated through association by using a cryptographic method. Each data block includes information of a batch of network transactions, the information being used for verifying the validity of information of the data block (anti-counterfeiting) and generating a next data block. The blockchain may include an underlying blockchain platform, a platform product service layer, and application service layer.

With reference to the foregoing description, an application scenario of the examples of the present subject matter is described by using an example.

First, in an application scenario of information promotion, a backend server needs to query the user who meets a recommendation requirement to push information. First, an administrator may set targeted user information in an administrator terminal. For example: a user whose gender may be female, whose academic credential may be master's degree, and whose work place may be within a scope of a first region. Index conditions are generated according to the user information, and an index request may be transmitted to the backend server, where the index request includes the index conditions. The backend server performs index to obtain a user that meets the index conditions according to the index condition, and feeds back the user information that meets the index conditions to the administrator terminal, so that the administrator terminal pushes a promotion message to a user account corresponding to the user information.

Second, in a scenario of searching for users. For example, using an interactive function in the application as an example, a user A publishes a help message through the interactive function, and the help message may be used for requesting other users to provide video shooting assistance, where the help message includes a terminal requirement, a user age requirement, a user geographic location requirement, or a user qualification requirement for assisting shooting. After receiving the help message, the server queries the user meeting the above-mentioned requirements for assisting the shooting, and forwards the help message. For example, a user B and a user C may be queried meeting the requirements for assisting shooting in the index table according to the inverted index, so the help message may be transmitted to the user B and the user C, instructing the user B and the user C to assist the user A in video shooting.

In the foregoing examples, a description is made by using a scenario of information promotion and a scenario of searching for users as examples. In some examples, the data processing method provided may further be applicable to other scenarios in which data crossover query needs to be performed, such as smart transportation, an in-vehicle smart system, smart home appliances, or the like. Specific application scenarios may be not limited in this example of the present subject matter.

Figure 2:
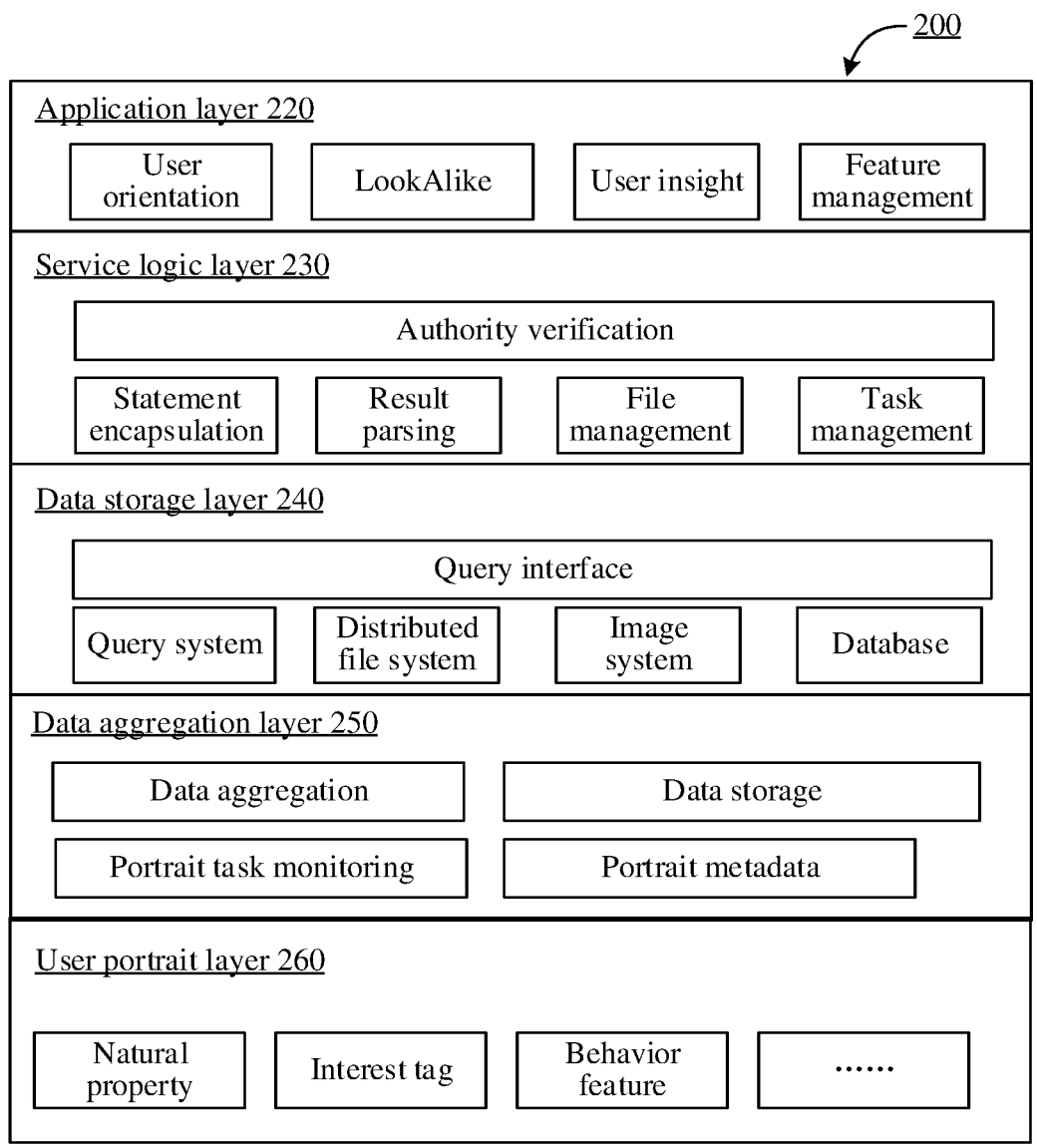
FIG. 2 is a schematic diagram of a framework of an inverted index retrieval system according to an example of the present subject matter.

For example, FIG. 2 is a schematic diagram of a framework of an inverted index retrieval system according to an example of the present subject matter. As shown in FIG. 2, a description is made by using an example in which the system may be applicable to processing the user portrait data. The inverted index retrieval system 200 includes: an application layer 220, a service logic layer 230, a data storage layer 240, a data aggregation layer 250, and a user portrait layer 260.

The application layer 220 may be mainly used for implementing: 1.1 user orientation, referring to performing targeted content delivery to the user according to historical behavior performance of the user and basic data; 1.2 Look Alike, a technology of finding, based on seed users, more potentially related similar groups through a specific algorithm evaluation model; and interactions such as 1.3 user insights and 1.4 feature management.

The service logic layer 230 may be mainly responsible for 2.1 authentication, that is, service authority verification; 2.2 statement encapsulation, converting a feature screening logic determined by the application layer into a special query statement; 2.3 file management, managing uploading and exporting files by the user; 2.4 monitoring a state of different index tasks; and 2.5 result parsing, parsing an index result, or the like.

The data storage layer 240 may be mainly used for providing: 3.1 query interface, that is, providing the query interface to perform inverted index query; 3.2 query system, that is, providing an overall architecture of data query; 3.3 distributed file system, that is, storing files in a manner of distributed storage; 3.4 image system; and 3.5 database, used for storing user portrait data, user uploading data, user orientation data, Look Alike data, and task-related information.

The data aggregation layer 250 may be mainly used for: 4.1 data aggregation, used for gathering and aggregating features stored in different database tables into one database table; 4.2 data storage, used for storing the aggregated database tables; 4.3 portrait task monitoring; and generating 4.4 portrait metadata, used for generating metadata corresponding to each data table in the database.

The user portrait layer 260 may be mainly used for storing portrait information of the user, different portraits may be virtually stored in different database tables, and the updated granularity may be different.

Figure 3:
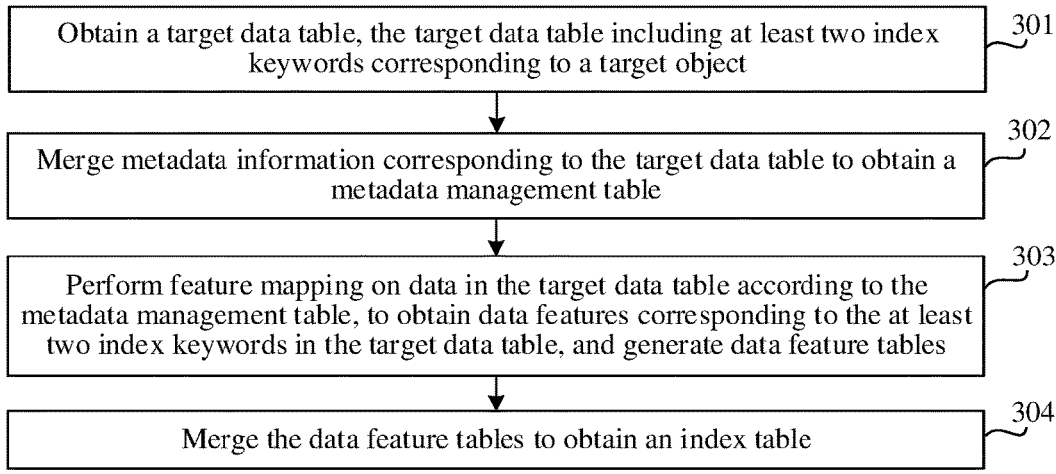
FIG. 3 is a flowchart of a data processing method according to an example of the present subject matter.

With reference to foregoing introduction, the data processing method provided in this example of the present subject matter is introduced. FIG. 3 is a flowchart of a data processing method according to an example of the present subject matter. A description is made by using an example in which the method may be applicable to a computer device (such as a server). As shown in FIG. 3, the method includes:

Step 301. Obtain a target data table, the target data table including at least two index keywords corresponding to a target object.

A manner of obtaining the target data table includes: obtaining a data table related to a current system from a database of the server as a target data table; or receiving a data table related to a current system transmitted by other servers as a target data table.

For example, a description is made by using the user portrait system as an example, a user portrait data table related to the user may be stored in the database of the server, and a plurality of data tables related to the user portrait data may be stored in the database of the server. Then, a data table related to the user portrait data may be obtained as a target data table, such as a user basic information table, a user behavior data table, a user interest portrait data table, or the like. The user basic information table may be used for storing basic information of the user, such as: name, age, gender, or the like. The user behavior data table may be used for storing a user behavior data record in a historical time period, such as: a historical browsing record, a historical purchase record, a historical download record, or the like; and the user interest portrait data table may be used for storing interest tags corresponding to the user, such as star chasing and entertainment news, indicating that the user may be highly interested in content related to the star chasing and the entertainment news.

The target data table includes at least two keywords corresponding to a target object. For example, using the target object as a user as an example, keywords corresponding to the user include: name, gender, age, geographic location, historical behavior data, interest tags, or the like.

In some examples, the data tables may be stored in different servers, then the server receives the target data tables transmitted by each of the servers.

In some examples, the server obtains at least two target data tables, thereby merging the at least two target data tables. At least two index keywords corresponding to the target object may be distributed in the at least two data tables. For example, an index keyword "age" corresponding to the target object may be in the user basic information table; and an index keyword "download history record" corresponding to the target object may be in the user behavior data table.

Step 302. Merge metadata information corresponding to the target data table to obtain a metadata management table.

Optionally, the target data table further corresponds to metadata information. Metadata, also referred to as intermediary data and relay data, may be data about data. The metadata may be information mainly used for describing data properties, which may be used for supporting functions such as indicating storage location, historical data, resource search, and file recording.

In some examples, metadata information corresponding to the target data table may be preset; or metadata information corresponding to the target data table may be obtained by recognition. For example, data in the target data table may be inputted into a recognition model obtained by pre-training, and the metadata information corresponding to the target data table may be obtained by recognition.

Optionally, when the metadata information may be merged, basic metadata information corresponding to the at least two index keywords in the target data table may be first determined to obtain a basic field information table; and other metadata information tables may be generated with the basic field information table as a core according to the at least two index keywords in the target data table to obtain a metadata management table. The other metadata information tables may be used for indicating index related information corresponding to the at least two index keywords.

Optionally, the basic metadata information corresponding to the at least two index keywords in the target data table may be obtained, where the basic metadata information may be used for describing basic external link information corresponding to the at least two index keywords; and the basic metadata information may be used as field information, to construct basic field information table corresponding to the at least two index keywords. In some examples, the basic metadata information may be preset.

That is, for the target data table, other related metadata information management tables may be derived with the feature field information as the core. For example, the generation of other metadata information management tables includes at least one of the following conditions:

First, the data theme table corresponding to the at least two index keywords may be generated with the basic field information table as the core, and a theme field foreign key in the basic field information table may be linked to the data theme table, where the data theme table may be used for indicating a theme relationship corresponding to the at least two index keywords; and For example, the data theme table may be used for indicating information such as a theme name, a parent theme, and a theme level corresponding to the index keywords, and the data theme table may be linked to a theme structure table. For example: a theme category corresponding to an index keyword "user click data" may be "behavioral data", where a first-level theme includes "touch behavior data", and a second-level theme includes "click behavior data" and "long press behavior data". Then, the index keyword "user click data" corresponds to the secondary theme "click behavior data".

Second, a metadata information table corresponding to the at least two index keywords may be generated with the basic field information table as the core, and a table field foreign key in the basic field information table may be linked to the metadata information table, where the metadata information table may be used for indicating metadata information corresponding to the at least two index keywords in the target data table; and third, the metadata information management table corresponding to the at least two index keywords may be generated with the basic field information table as the core, and a data type field foreign key in the basic field information table may be linked to the metadata information management tables, where the metadata information management table includes a data type and a value range corresponding to each of the at least two index keywords.

After the other metadata information tables may be generated, the metadata management table may be determined according to a foreign key link relationship between the basic field information table and the other metadata information tables.

For example, the basic metadata information of the target data table includes the following information:

a tag identity (id), globally unique (tag_id), used for uniquely indicating the index keyword; a tag field name (tag_field); a tag Chinese name (field_name); a tag physical storage type (field_physic_type), such as: a bigint or string storage type; and a responser, used for representing a person responsible for managing the metadata information.

Based on the basic metadata information, additional basic metadata information may be obtained by diffusion, that is, derived attributes of the basic metadata information, including:

a theme id (theme_id): a theme corresponding to the index keyword, which may be linked to a theme table through a foreign key;

a table id (table_id): table information corresponding to the index keyword may be linked to the metadata information management table through a foreign key; and a tag logic type (logic_type): used for indicating whether the index keyword corresponds to a classification tag or a continuous tag. In some examples, if the index keyword belongs to a classification tag, the index keyword may be linked to the metadata information management table of a classification value range through a foreign key.

Figure 4:
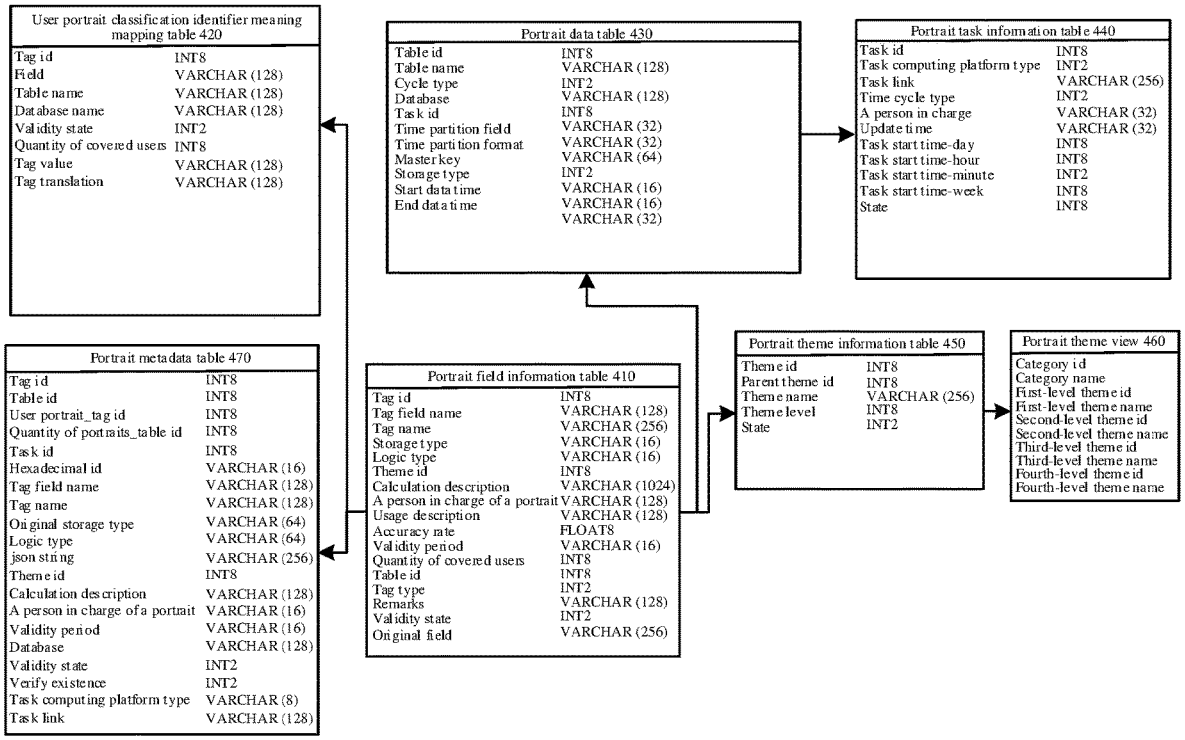
FIG. 4 is a schematic structural diagram of a metadata management table provided based on the example shown in FIG. 3.

For example, FIG. 4 is a schematic structural diagram of a metadata management table according to an example of the present subject matter. As shown in FIG. 4, the metadata management table includes a portrait field information table 410 (that is, corresponding to the basic field information table), and other related metadata information management tables may be derived with feature field information in the basic field information table as the core. FIG. 4 shows a user portrait classification identifier meaning mapping table 420, a portrait data table 430, a portrait task information table 440, a portrait theme information table 450, and a portrait theme view table 460 derived from the portrait theme information table 450.

The portrait field information table 410 includes the following fields: a tag_id, a tag field_name, a tag name, a storage type, a logic_type, a theme_id, calculation description, a person in charge of a portrait, usage description, accuracy rate, validity period, a quantity of covered users, a table_id, a tag type, remarks, a validity state, an original field, or the like.

The derived user portrait classification identifier meaning mapping table 420 includes the following fields: a tag_id, a field, a table name, a database name, a validity state, a quantity of covered users, a tag value, and tag translation.

The derived portrait data table 430 includes the following fields: a table_id, a table name, a cycle type, a database, a task id, a time partition field, a time partition format, a master key, a storage type, a start data time, an end data time, or the like.

The derived portrait task information table 440 includes the following fields: a task id, a task computing platform type, a task link, a time cycle type, a person in charge, an update time, a task start time-day, a task start time-hour, a task start time-minute, a task start time-week, and a state.

The derived portrait theme information table 450 includes the following fields: a theme_id, a parent theme_id, a theme name, a theme level, a state, or the like.

The portrait theme view table 460 derived from the portrait theme information table 450 includes the following structures: a category id, a category name, a first-level theme_id, a first-level theme name, a second-level theme_id, a second-level theme name, a third-level theme_id, a third-level theme name, a fourth-level theme_id, a fourth-level theme name, or the like.

Optionally, after the metadata information may be aggregated, a portrait metadata table 470 may be finally obtained. In addition, the portrait metadata table 470 may be applicable to a subsequent application layer, a service logic layer, and a data aggregation layer.

Figure 5:
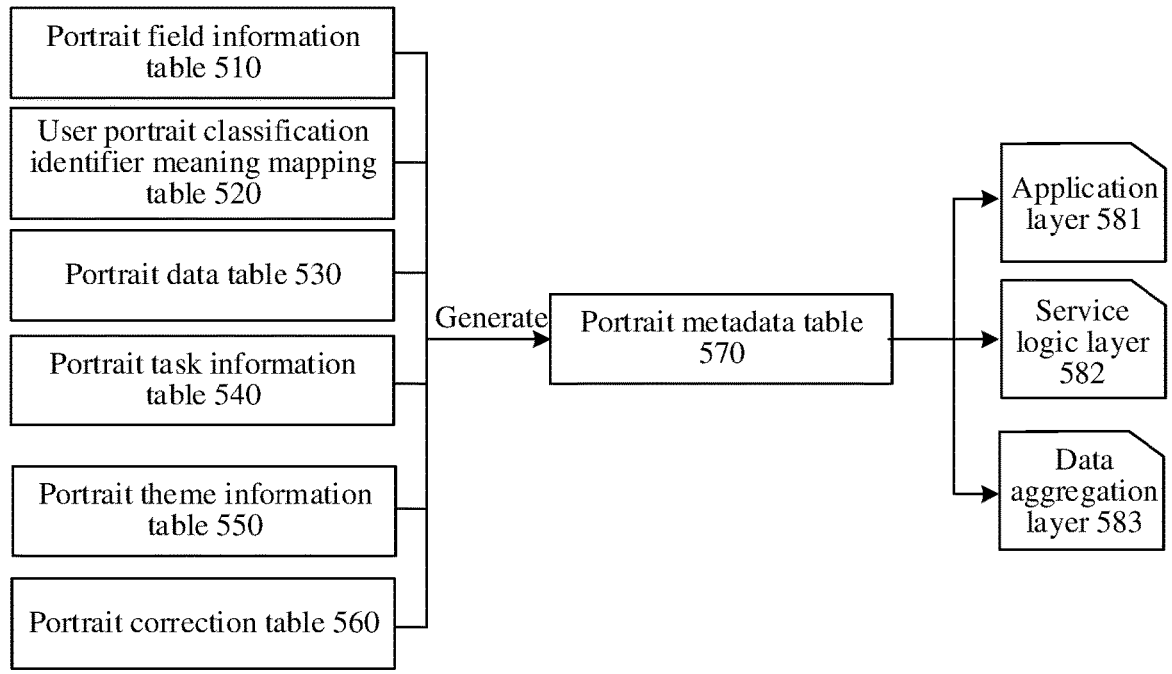
FIG. 5 is a flowchart of obtaining a portrait metadata table by aggregating metadata information provided based on the example shown in FIG. 3.

For example, referring to FIG. 5, a portrait field information table 510, a user portrait classification identifier meaning mapping table 520, a portrait data table 530, a portrait task information table 540, a portrait theme information table 550, and a portrait correction table 560 may be aggregated to obtain a portrait metadata table 570, and the portrait metadata table 570 may be applicable to the application layer 581, the service logic layer 582, and the data aggregation layer 583.

Step 303. Perform feature mapping on the data in the target data table according to the metadata management table, to obtain data features corresponding to the at least two index keywords in the target data table, and generate a data feature table.

Optionally, because data types in the target data table may be different, the feature mapping manners that may be performed may also be different. For example, classification data may be mapped in the manner of a classification value range; and for numerical data, a value of the numerical data may be directly used as the data feature.

Step 304. Merge the data feature tables to obtain an index table.

In some examples, if the data feature tables include a wide table feature and a vertical table feature, then the wide table features and the vertical table features may be respectively merged, and the obtained wide table and vertical table may be merged to obtain an index table.

The index table may be used for correspondingly storing the target object and the data feature corresponding to the target object.

In summary, in the data processing method provided in this example of the present subject matter, the metadata information of the target data table may be constructed into a metadata management table, and an index table corresponding to the target data table may be generated according to the metadata management table, so that the inverted index of the data may be implemented through the index table, the efficiency of performing crossover query on different types of data may be improved, and the time required for performing index query on the data may be reduced.

Figure 6:
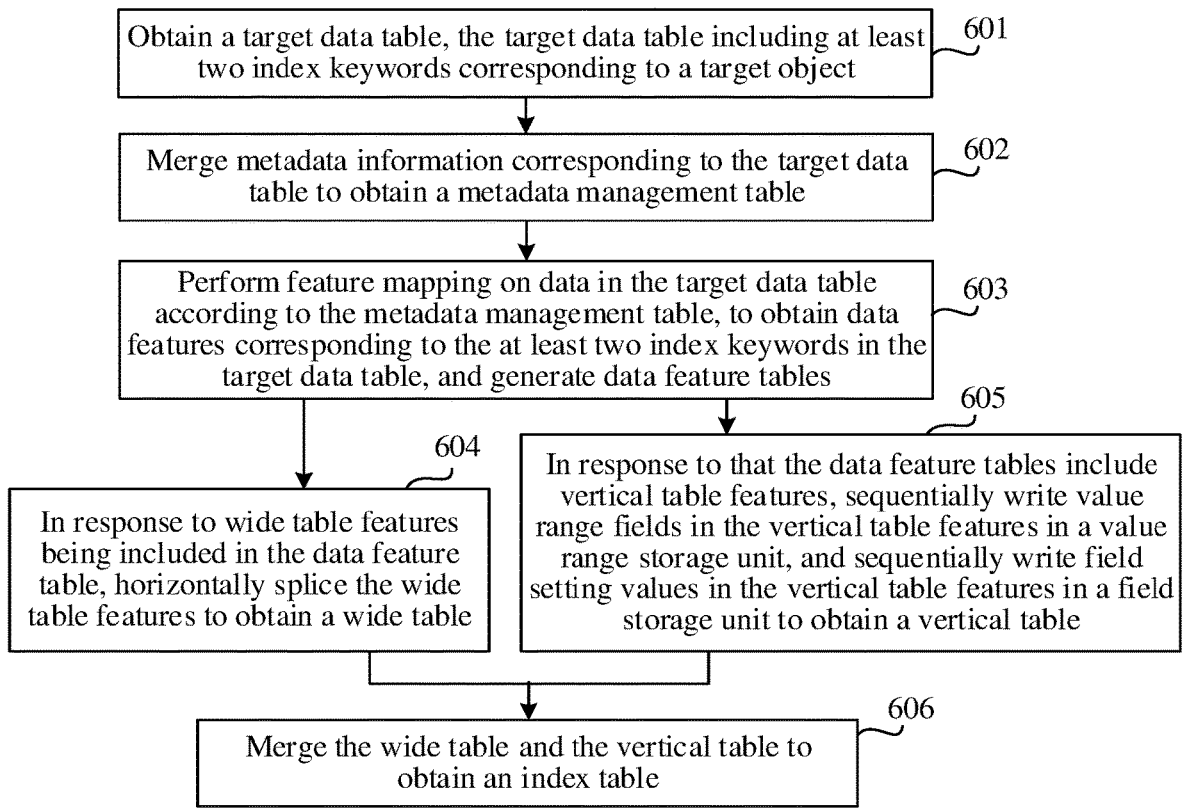
FIG. 6 is a flowchart of a data processing method according to another example of the present subject matter.

In an optional example, different feature mapping may be performed for different types of data. FIG. 6 is a flowchart of a data processing method according to another example of the present subject matter. A description is made by using an example in which the method may be applicable to the server. As shown in FIG. 6, the method includes the following steps:

Step 601. Obtain a target data table, the target data table including at least two index keywords corresponding to a target object.

The process of obtaining the target data table may be described in step 301, and details are not repeated herein.

Step 602. Merge metadata information corresponding to the target data table to obtain a metadata management table.

Optionally, when the metadata information may be merged, the basic metadata in the target data table may be determined first according to the index keywords to obtain the basic field information table; and therefore, other metadata information tables may be generated with the basic field information table as the core according to the index keywords in the target data table, and the metadata management table may be obtained.

That is, for the target data table, other related metadata information management tables may be derived with the feature field information as the core.

Step 603. Perform feature mapping on the data in the target data table according to the metadata management table, to obtain data features corresponding to the at least two index keywords in the target data table, and generate a data feature table.

Optionally, because data types in the target data table may be different, the feature mapping manners that may be performed may also be different.

In some examples, the classification data corresponding to the index keywords may be included in the target data table; and the classification data in the target data table may be mapped into value ranges corresponding to the classification types according to the metadata management table, to obtain the feature values corresponding to the feature data as the data features.

For example, an index keyword whose tag_id may be 10000 may be the academic credential of the user, and there may be six corresponding classification value ranges such as primary school education, junior middle education, senior middle education, undergraduate, postgraduate, and doctorate. In this case, the six corresponding classification value ranges may be mapped to six numbers such as 0 to 5 (recorded as sort_id), and a unique encrypted feature hex_id may be generated as the data feature corresponding to the classification data in the following manner:

$$hex\_id = concat('h', lower(hex(concat(tag\_id, '000', sort\_id)))), \text{ where}$$

hex( ) may be used for representing a hex character conversion algorithm, such as: converting content represented by the hexadecimal corresponding to each byte into a character string for display. lower( ) may be used for representing a lower character conversion algorithm, such as: converting uppercase characters in a character string to lowercase characters. concat( ) represents a connection algorithm, that is, connecting at least two parts of to obtain a unique encryption feature hex_id, where h may be a preset value.

In some examples, the target data table includes location service data corresponding to the index keywords, that is, the location based service (LBS) data.

The preset map data may be divided into n grids according to the metadata management table, where n may be a positive integer, and corresponding grid identifiers may be labeled on the n grids, so that the location service data may be mapped to the grids to obtain the grid identifiers of the location service data as a data feature.

Figure 7:
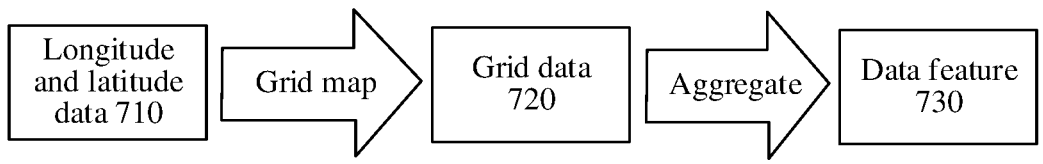
FIG. 7 is a schematic diagram of a mapping process of location service data provided based on the example shown in FIG. 6.

FIG. 7 shows a mapping process of the location service data according to an example of the present subject matter. As shown in FIG. 7, longitude and latitude data 710 corresponding to the index keywords in the target data table may be first obtained, network mapping may be performed on the longitude and latitude data 710 to obtain grid data 720. The grid data 720 includes grid ids corresponding to the latitude and longitude data. After the grid data 720 may be aggregated, a data feature 730 corresponding to the location service data may be finally obtained.

For example, first, a map may be divided into 200 million grids of 100 m×100 m, each grid may be labeled by a unique id, and a grid division method of 100 m×100 m may be as follows:

grid$y$=ceil(longitude×1000), and grid$x$=ceil(latitude× 1000), where gridy represents a y-axis coordinate of the grid, gridx represents an x-axis coordinate of the grid, and ceil represents a calculation function. Optionally, a coordinate system may be a Cartesian coordinate system set for the grids that may be divided for the map.

A calculation method for the grid id may be as follows:

grid id=grid$x$−(73×1000)+(136−73)×1000×(grid$y$−3× 1000).

Latitude and longitude information of the user may be mapped to a grid. For each user, all the latitude and longitude information may be aggregated into a character string grid_id_list of the grid id, and the grid_id_list may be stored in the form of text. Locations may be retrieved in the manner of grid id character string retrieval. In some examples, time spent on retrieving 10,000 grids (100 square kilometers) may be less than 3 seconds.

In some examples, the data types include text data, LBS data, and numerical data.

1. The text data may be often used for storing type information, such as: a user hobby, an interest tag, or the like. For the text data, spaces may be used as a separation for splicing, and the text data may be stored as a feature in the form of text.
2. For a mapping manner of the LBS data, reference may be made to the mapping process of the location service data, and details are not repeated herein.
3. The numerical data may be often used for storing continuous features, such as age, quantity of times, or the like; or storing numerical category features, such as academic credential, gender, or the like; and such features may be directly stored in the form of numerical values.

Step 604. In response to wide table features being included in the data feature table, horizontally splice the wide table features to obtain a wide table.

In some examples, first, a table type may be determined. For the wide table features, splicing may be performed on the same wide table, and a splicing manner may be "key1: value1, key2: value2, . . . , and keyN: valueN". That is, key-value pairs may be connected and spliced in a horizontal splicing manner.

For example, as shown in the Table 1 below:

TABLE 1

| User identifier | Name | Age | Gender |
|---|---|---|---|
| 001 | A | 25 | 0 |

Wide table features 1 corresponding to a user identifier 001 include: "name: A, age: 25, and gender: 0 (representing male)".

As shown in the Table 2 below:

TABLE 2

| User identifier | Interest 1 | Interest 2 |
|---|---|---|
| 001 | Football | Basketball |

Wide table features 2 include: "interest 1: football, and interest 2: basketball".

Then, after the wide table features 1 and the wide table features 2 may be horizontally spliced, a wide table may be obtained as shown in Table 3 below:

TABLE 3

| User identifier | Name | Age | Gender | Interest 1 | Interest 2 |
|---|---|---|---|---|---|
| 001 | A | 25 | 0 | Football | Basketball |

Step 605. In response to that the data feature tables include vertical table features, sequentially write value range fields in the vertical table features in a value range storage unit, and sequentially write field setting values in the vertical table features in a field storage unit to obtain a vertical table.

In some examples, first, a table type may be determined. Vertical table features may be spliced into "key: value", where value range fields may be correspondingly and sequentially written in the key, and field setting values may be correspondingly and sequentially written in the value.

For example, as shown in the Table 4 below:

TABLE 4

| User identifier | Key | value |
|---|---|---|
| 001 | Name | A |
| 001 | Age | 25 |
| 001 | Gender | 0 |

Then, the splicing of the vertical table refers to that key-value pairs that need to be written continue to be written down into the vertical table.

Step 606. Merge the wide table and the vertical table to obtain an index table.

Optionally, the wide table and the vertical table may be horizontally spliced to obtain the index table.

That is, the key-value pairs in the vertical table may be inserted into a structure of the wide table, and data in the vertical table may be spliced with data in the wide table in a horizontal splicing manner.

In summary, in the data processing method provided in this example of the present subject matter, the metadata information of the target data table may be constructed into a metadata management table, and an index table corresponding to the target data table may be generated according to the metadata management table, so that the inverted index of the data may be implemented through the index table, the efficiency of performing crossover query on different types of data may be improved, and the time required for performing index query on the data may be reduced.

In the method provided in this example, crossover query of different types of data such as the longitude and latitude data, the text data, and the numerical data can be simultaneously processed, thereby improving the feedback efficiency and feedback speed in a data query process.

In the method provided in this example, a design method for a portrait system for automatic data aggregation and automatic storage of the wide table and the vertical table may be implemented, and the data processing efficiency may be improved.

Figure 8:
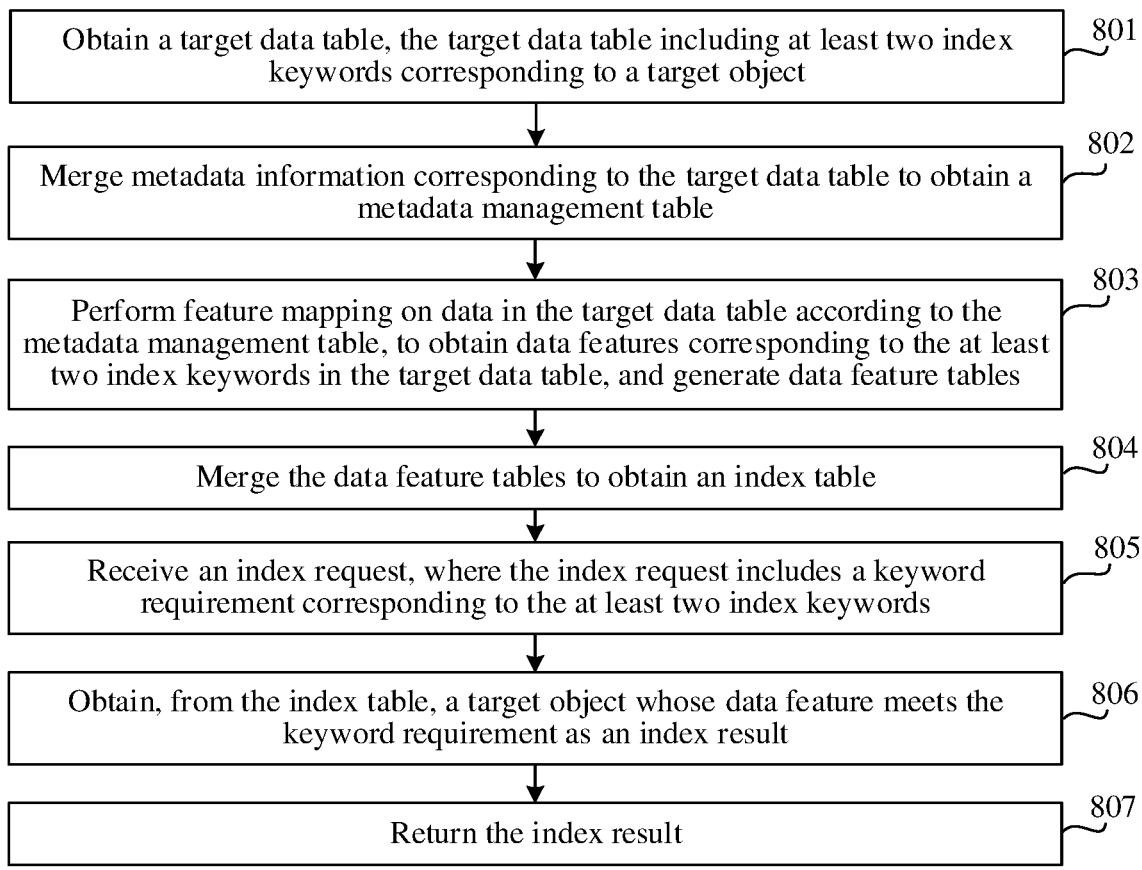
FIG. 8 is a flowchart of a data processing method according to another example of the present subject matter.

In some examples, after the index table may be created, when index may be performed on the data, the index may be performed according to an identifier and a mapping value in the index table, and a corresponding result may be returned. FIG. 8 is a flowchart of a data processing method according to another example of the present subject matter. A description is made by using an example in which the method may be applicable to the server. As shown in FIG. 8, the method includes the following steps:

Step 801. Obtain a target data table, the target data table including at least two index keywords corresponding to a target object.

A manner of obtaining the target data table includes: obtaining a data table related to a current system from a database of the server as a target data table; or receiving a data table related to a current system transmitted by other servers as a target data table.

Step 802. Merge metadata information corresponding to the target data table to obtain a metadata management table.

Optionally, when the metadata information may be merged, the basic metadata in the target data table may be determined first according to the index keywords to obtain the basic field information table; and therefore, other metadata information tables may be generated with the basic field information table as the core according to the index keywords in the target data table, and the metadata management table may be obtained.

That is, for the target data table, other related metadata information management tables may be derived with the feature field information as the core.

Step 803. Perform feature mapping on the data in the target data table according to the metadata management table, to obtain data features corresponding to the at least two index keywords in the target data table, and generate a data feature table.

Optionally, because data types in the target data table may be different, the feature mapping manners that may be performed may also be different. For example, classification data may be mapped in the manner of a classification value range.

Step 804. Merge the data feature tables to obtain an index table.

In some examples, if the data feature tables include a wide table feature and a vertical table feature, then the wide table features and the vertical table features may be respectively merged, and the obtained wide table and vertical table may be merged to obtain an index table.

The index table may be used for correspondingly storing the target object and the data feature corresponding to the target object.

Step 805. Receive an index request, where the index request includes a keyword requirement corresponding to the at least two index keywords.

Optionally, the index request may be transmitted by the terminal to the server. That is, after setting an index condition in the terminal, the user transmits the index request to the server, where a keyword requirement in the index request corresponds to the index condition set by the user.

Figure 9:
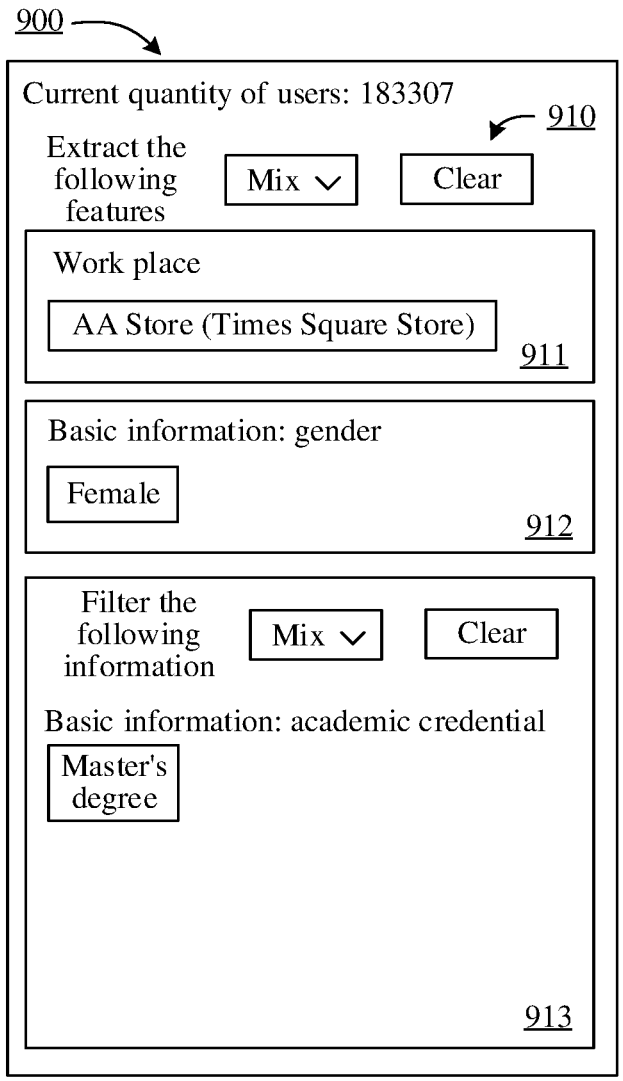
FIG. 9 is a schematic diagram of an interface of an index interface provided based on the example shown in FIG. 8.

For example, referring to FIG. 9, an index interface 900 may be displayed on a terminal display screen, in which an index condition 910 set by the user may be displayed, and which includes an index condition 911, an index condition 912, and an index condition 913. The index condition 911 may be used for indicating that a work place may be located in Times Square, the index condition 912 may be used for indicating that the gender may be female, and the index condition 913 may be used for filtering out a user whose academic credential may be master's degree, that is, a reverse setting condition may be that an academic credential requirement may not be master's degree.

The terminal transmits an index request to the server according to the index condition 911, the index condition 912, and the index condition 913, where the index request includes a keyword requirement used for indicating the index condition.

Step 806. Obtain, from the index table, the target object whose data feature meets the keyword requirement as an index result.

For example, a user whose work place may be a specific building and whose age may be greater than 18 is queried. Assuming that hex_id=h1111 may be a work place feature and hex_id=h2222 may be an age feature, what needs to be queried may be h1111 with the latitude and longitude of the building, and h2222 needs to be greater than 18, so that crossover query of latitude and longitude and age may be implemented; and so far, data has been constructed from the original data table to the inverted index system. Crossover query of a plurality of data types may be implemented by simply clicking on the page.

Step 807. Return the index result.

In summary, in the data processing method provided in this example of the present subject matter, the metadata information of the target data table may be constructed into a metadata management table, and an index table corresponding to the target data table may be generated according to the metadata management table, so that the inverted index of the data may be implemented through the index table, the efficiency of performing crossover query on different types of data may be improved, and the time required for performing index query on the data may be reduced.

In the method provided in this example, a fast retrieval engine based on the inverted index may be provided, which constructs a portrait system that can support multimodal crossover query, can simultaneously process crossover query of different types of data such as latitude and longitude data, text data, and numerical data, and can return a result in seconds for hundreds of millions of portrait queries.

In the method provided in this example, a design method for a portrait system for automatic data aggregation and automatic storage of the wide table and the vertical table may be implemented.

In the method provided in this example, the difficulties in the field of big data analysis that it may be difficult to perform crossover query on different types of data, and it may be difficult to perform rapid downlink analysis on billion-level data and return the data in seconds may be resolved.

Figure 10:
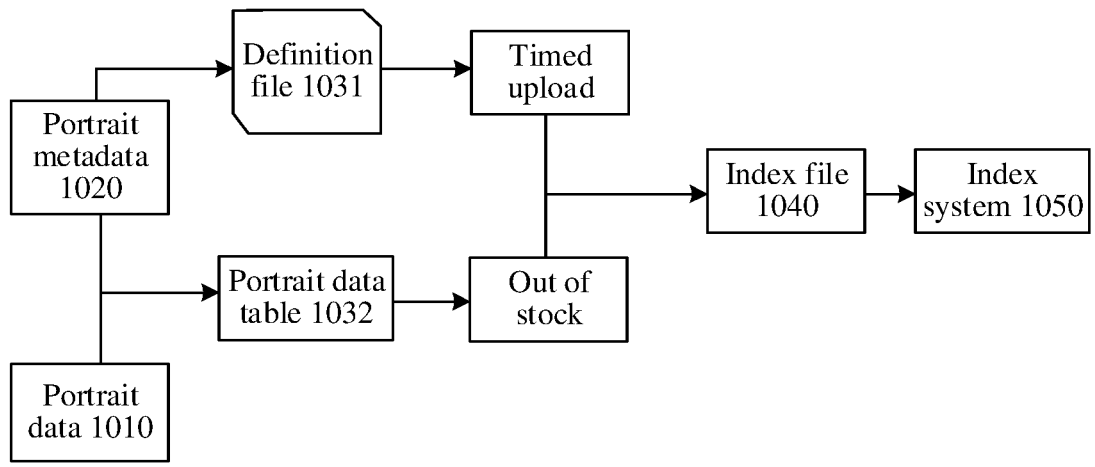
FIG. 10 is a schematic diagram of an overall technical framework according to an example of the present subject matter.

FIG. 10 is a schematic diagram of an overall technical framework according to an example of the present subject matter. As shown in FIG. 10, using the technical framework that may be applicable to a process of generating an index file of user portrait data as an example, first portrait data 1010 may be obtained, and portrait metadata 1020 of the portrait data 1010 may be determined. A definition file 1031 may be generated according to the portrait metadata 1020. The definition file 1031 may be a metadata management table used for performing data mapping and index management in the target data table, and a portrait data table 1032 may be automatically generated according to the portrait data 1010 and the portrait metadata 1020. An index file 1040 may be generated with reference to the definition file 1031 and the portrait data table 1032, and the index file 1040 may be deployed into an index system 1050, so that an inverted index may be implemented through the index system 1050.

Figure 11:
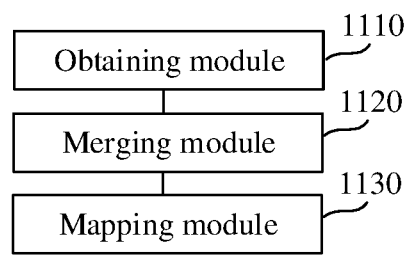
FIG. 11 is a structural block diagram of a data processing apparatus according to an example of the present subject matter.

FIG. 11 is a structural block diagram of a data processing apparatus according to an example of the present subject matter. As shown in FIG. 11, the apparatus includes:

- an obtaining module 1110, configured to obtain a target data table, the target data table including at least two index keywords corresponding to a target object;
- a merging module 1120, configured to merge metadata information corresponding to the at least two index keywords in the target data table to obtain a metadata management table;
- a mapping module 1130, configured to perform feature mapping on data in the target data table according to the metadata management table to obtain data features corresponding to the at least two index keywords in the target data table, and generate data feature tables; and
- the merging module 1120, further configured to merge the data feature tables to obtain an index table, the index table being used for correspondingly storing the target object and a data feature corresponding to the target object.

Figure 12:
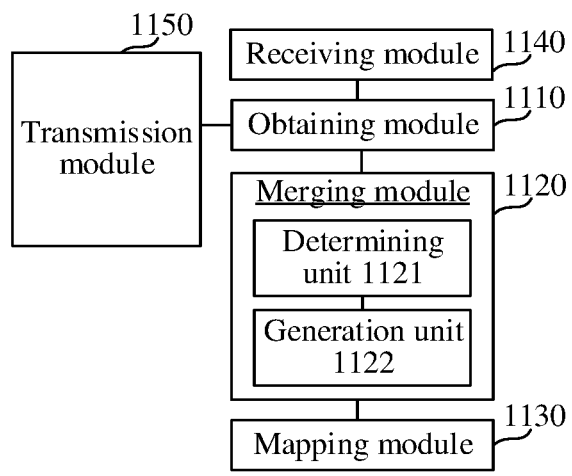
FIG. 12 is a structural block diagram of a data processing apparatus according to another example of the present subject matter.

In an optional example, as shown in FIG. 12, the merging module 1120 includes:

- a determining unit 1121, configured to determine basic metadata information corresponding to the at least two index keywords in the target data table to obtain a basic field information table; and
- a generation unit 1122, configured to generate other metadata information tables according to the at least two index keywords in the target data table with the basic field information table as a core to obtain the metadata management table, where the other metadata information tables may be used for indicating index related information corresponding to the at least two index keywords.

In an optional example, the generation unit 1122 may be further configured to a generate data theme table corresponding to the at least two index keywords with the basic field information table as the core; and link a theme field foreign key in the basic field information table to the data theme table, where the data theme table may be used for indicating a theme relationship corresponding to the at least two index keywords; or the generation unit 1122 may be further configured to generate a metadata information table corresponding to the at least two index keywords with the basic field information table as the core; and link a table field foreign key in the basic field information table to the metadata information table, where the metadata information table may be used for indicating the metadata information corresponding to the at least two index keywords; or the generation unit 1122 may be further configured to generate a metadata information management table corresponding to the at least two index keywords with the basic field information table as the core; and link a data type field foreign key in the basic field information table to the metadata information management tables, where the metadata information management table includes a data type and a value range corresponding to each of the at least two index keywords.

In an optional example, the determining unit 1121 may be further configured to determine the metadata management table according to a foreign key link relationship between fields in the basic field information table and the other metadata information tables.

In an optional example, the determining unit 1121 may be further configured to obtain the basic metadata information corresponding to the at least two index keywords in the target data table, where the basic metadata information may be used for describing basic external link information corresponding to the at least two index keywords; and use the basic metadata information as field information to construct basic field information table corresponding to the at least two index keywords.

In an optional example, the target data table includes classification data corresponding to the at least two index keywords; and the mapping module 1130 may be further configured to map the classification data in the target data table to value ranges corresponding to classification types according to the metadata management table to obtain feature values corresponding to the classification data as the data features.

In an optional example, the target data table includes location service data corresponding to the at least two index keywords; and the mapping module 1130 may be further configured to divide preset map data into n grids according to the metadata management table, where n may be a positive integer; label the n grids with corresponding grid identifiers; and map the location service data into the grids, to obtain grid identifiers of the location service data as the data features.

In an optional example, the merging module 1120 may be further configured to horizontally splice, in response to that the data feature tables include wide table features, the wide table features corresponding to the at least two index keywords to obtain a wide table; in response to that the data feature tables include vertical table features, sequentially write value range fields in the vertical table features corresponding to the at least two index keywords in a value range storage unit, and sequentially write field setting values in the vertical table features in a field storage unit to obtain a vertical table; and the merging module 1120 may be further configured to merge the wide table and the vertical table to obtain the index table.

In an optional example, the merging module 1120 may be further configured to horizontally splice the wide table and the vertical table to obtain the index table.

In an optional example, the apparatus further includes: a receiving module 1140, configured to receive an index request, where the index request includes a keyword requirement corresponding to the at least two index keywords; the obtaining module 1110, further configured to obtain a target object whose data features meet the keyword requirement from the index table as an index result; and a transmission module 1150, configured to return the index result.

In an optional example, the obtaining module 1110 may be further configured to determine a feature requirement corresponding to the keyword requirement, where the feature requirement may be used for expressing the keyword requirement in a feature form; and obtain an object whose data feature meets the feature requirement from the index table as the index result.

In an optional example, the obtaining module 1110 may be further configured to obtain at least two target data tables, where the at least two index keywords corresponding to the target object may be distributed in the at least two target data tables.

In summary, in a data processing apparatus provided in this example of the present subject matter, a metadata management table may be constructed through the metadata information of the target data table, and an index table corresponding to the target data table may be generated according to the metadata management table, thereby implementing the inverted index of the data through the index table, improving the efficiency of performing crossover query on different types of data, and reducing the time required for performing the index query on the data.

The data processing apparatus provided in the foregoing examples may be illustrated with an example of division of the foregoing functional modules. In actual application, the foregoing functions may be assigned to and completed by different function modules as required. That is, an internal structure of the device may be divided into different function modules to complete all or some of the functions described above. In addition, the data processing apparatus and data processing method provided in the foregoing example belongs to the same concept as the example of the method for processing data. For a specific implementation process of the apparatus, refer to the method example, and details are not described herein again.

Figure 13:
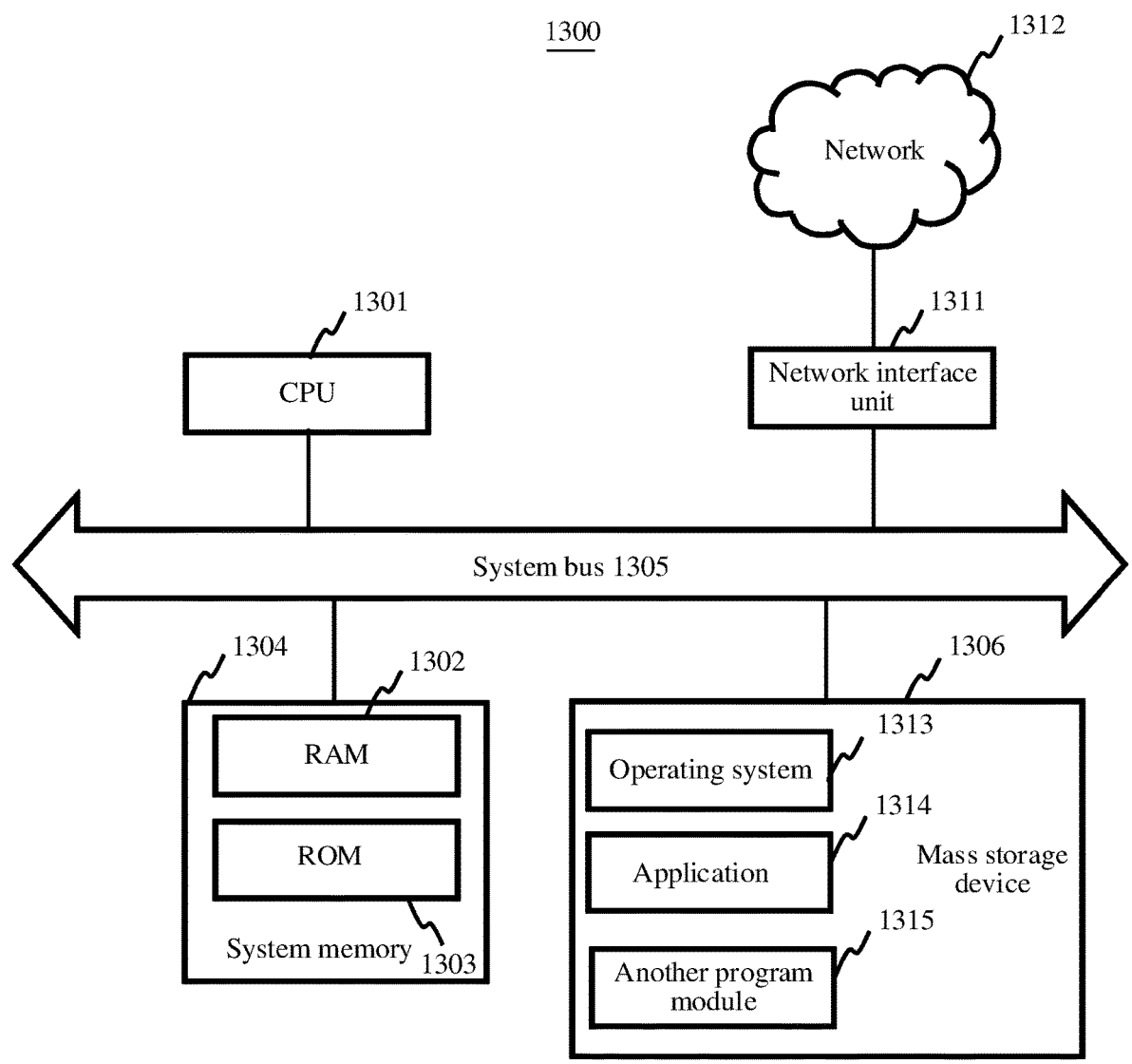
FIG. 13 is a structural block diagram of a server according to an example of the present subject matter.

FIG. 13 is a schematic structural diagram of a server according to an example of the present subject matter. Specifically: the server 1300 includes a central processing unit (CPU) 1301, a system memory 1304 including a random access memory (RAM) 1302 and a read-only memory (ROM) 1303, and a system bus 1305 connecting the system memory 1304 to the CPU 1301. The server 1300 further includes a large-capacity storage device 1306 configured to store an operating system 1313, an application program 1314 and another program module 1315.

The mass storage device 1306 may be connected to the CPU 1301 by using a mass storage controller (not shown) connected to the system bus 1305. The mass storage device 1306 and a non-transitory computer-readable medium associated with the mass storage device 1306 provide non-volatile storage for the server 1300. That is, the mass storage device 1306 may include a non-transitory computer-readable medium (not shown) such as a hard disk or a compact disc read only memory (CD-ROM) drive.

In general, the computer-readable medium may include a computer storage medium and a communication medium. The computer storage medium includes volatile and non-volatile media, and removable and non-removable media implemented by using any method or technology and configured to store information such as a non-transitory computer-readable instruction, a data structure, a program module, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a magnetic cassette, a magnetic tape, a magnetic disk memory, or another magnetic storage device. Certainly, a person skilled in the art may know that the computer storage medium may not be limited to the foregoing types. The system memory 1304 and the mass storage device 1306 may be collectively referred to as a memory.

According to various examples of the present subject matter, the server 1300 may further be connected, by using a network such as the Internet, to a remote computer on the network and run. That is, the server 1300 may be connected to a network 1312 by using a network interface unit 1311 that may be connected to the system bus 1305, or may be connected to a network of another type or a remote computer system (not shown) by using the network interface unit 1311.

The memory further includes one or more programs, which may be stored in the memory and may be configured to be executed by the CPU.

An example of the present subject matter further provides a computer device, the computer device including a processor and a memory, the memory storing at least one instruction, at least one segment of program, a code set, or an instruction set, the at least one instruction, the at least one segment of program, the code set, or the instruction set being loaded and executed by the processor to implement the data processing method provided in the foregoing method examples.

An example of the present subject matter further provides a non-transitory computer-readable storage medium, the computer-readable storage medium storing at least one instruction, at least one segment of program, a code set, or an instruction set, the at least one instruction, the at least one segment of program, the code set, or the instruction set being loaded and executed by the processor to implement the data processing method provided in the foregoing method examples.

An example of the present subject matter further provides a computer program product or a computer program. The computer program product or the computer program includes a computer instruction. The computer instruction may be stored in a non-transitory computer-readable storage medium. A processor of a computer device reads the computer instructions from the computer-readable storage medium, and executes the computer instructions, to cause the computer device to implement the foregoing data processing method according to any one of the foregoing examples of the present subject matter.

Optionally, the computer-readable storage medium may include: a ROM, a RAM, a solid state drive (SSD), an optical disc, or the like. The RAM may include a resistance random access memory (ReRAM) and a dynamic random access memory (DRAM). The sequence numbers of the foregoing examples of the present subject matter are merely for description purpose, and are not intended to indicate the preference among the examples.

A person of ordinary skill in the art may understand that all or some of the steps of the foregoing examples may be implemented by hardware, or may be implemented by a program instructing relevant hardware. The program may be stored in a non-transitory computer-readable storage medium. The storage medium may be a read-only memory, a magnetic disk, an optical disc, or the like.

The foregoing descriptions are merely optional examples of the present subject matter, but are not intended to limit the present subject matter. Any modification, equivalent replacement, or improvement made within the spirit and principle of the present subject matter shall fall within the protection scope of the present subject matter.

What is claimed is:
1. A data processing method comprising:
 obtaining, by a computing device, a target data table comprising at least two index keywords corresponding to a target object;

merging metadata information corresponding to the at least two index keywords in the target data table to obtain a metadata management table;

performing feature mapping on data in the target data table according to the metadata management table to obtain data features corresponding to the at least two index keywords in the target data table and to generate data feature tables; and merging the data feature tables to obtain an index table to correspondingly store the target object and a data feature corresponding to the target object, wherein the merging the data feature tables comprises:

in response to that the data feature tables comprise wide table features, horizontally splicing the wide table features corresponding to the at least two index keywords to obtain a wide table;

in response to that the data feature tables comprise vertical table features, sequentially writing value range fields in the vertical table features corresponding to the at least two index keywords in a value range storage, and sequentially writing field setting values in the vertical table features in a field storage to obtain a vertical table; and merging the wide table and the vertical table to obtain the index table.

2. The method according to claim 1, wherein the merging metadata information corresponding to the at least two index keywords in the target data table to obtain a metadata management table comprises:

determining basic metadata information corresponding to the at least two index keywords in the target data table to obtain a basic field information table; and generating other metadata information tables according to the at least two index keywords in the target data table with the basic field information table as a core to obtain the metadata management table, and wherein the other metadata information tables are used for indicating index related information corresponding to the at least two index keywords.

3. The method according to claim 2, wherein the generating other metadata information tables according to the at least two index keywords in the target data table comprises:

generating a data theme table corresponding to the at least two index keywords with the basic field information table as the core; and linking a theme field foreign key in the basic field information table to the data theme table, wherein the data theme table is used for indicating a theme relationship corresponding to the at least two index keywords;

or generating a metadata information table corresponding to the at least two index keywords with the basic field information table as the core; and linking a table field foreign key in the basic field information table to the metadata information table, wherein the metadata information table is used for indicating the metadata information corresponding to the at least two index keywords;

or generating a metadata information management table corresponding to the at least two index keywords with the basic field information table as the core; and linking a data type field foreign key in the basic field information table to the metadata information management tables, wherein the metadata information management table comprises a data type and a value range corresponding to each of the at least two index keywords.

4. The method according to claim 3, further comprising: determining the metadata management table according to a foreign key link relationship between fields in the basic field information table and the other metadata information tables.

5. The method according to claim 2, wherein the determining basic metadata information corresponding to the at least two index keywords in the target data table to obtain a basic field information table comprises:

obtaining the basic metadata information corresponding to the at least two index keywords in the target data table, wherein the basic metadata information is used for describing basic external link information corresponding to the at least two index keywords; and using the basic metadata information as field information to construct basic field information table corresponding to the at least two index keywords.

6. The method according to claim 1, wherein the target data table comprises classification data corresponding to the at least two index keywords; and the performing feature mapping on data in the target data table according to the metadata management table to obtain data features corresponding to the at least two index keywords in the target data table further comprises:

mapping the classification data in the target data table to value ranges corresponding to classification types according to the metadata management table, to obtain feature values corresponding to the classification data as the data features.

7. The method according to claim 1, wherein the target data table comprises location service data corresponding to the at least two index keywords; and the performing feature mapping on data in the target data table according to the metadata management table to obtain data features corresponding to the at least two index keywords in the target data table further comprises:

dividing preset map data into n grids according to the metadata management table, wherein n is a positive integer;

labeling then grids with corresponding grid identifiers; and mapping the location service data into the grids, to obtain grid identifiers of the location service data as the data features.

8. The method according to claim 1, wherein the step of merging the wide table and the vertical table to obtain the index table comprises: horizontally splicing the wide table and the vertical table to obtain the index table.

9. The method according to claim 1, wherein after the merging the data feature tables corresponding to the at least two index keywords to obtain an index table, the method further comprises:

receiving an index request, wherein the index request comprises a keyword requirement corresponding to the at least two index keywords;

obtaining an object whose data feature meets the keyword requirement from the index table as an index result; and returning the index result.

10. The method according to claim 9, wherein the obtaining an object whose data feature meets the keyword requirement from the index table as an index result comprises:

determining a feature requirement corresponding to the keyword requirement, wherein the feature requirement is used for expressing the keyword requirement in a feature form; and obtaining an object whose data feature meets the feature requirement from the index table as the index result.

11. The method according to claim 1, wherein the step of obtaining a target data table comprises: obtaining at least two target data tables, wherein the at least two index keywords corresponding to the target object are distributed in the at least two target data tables.

12. A data processing apparatus, comprising:
one or more processors; and
memory storing instruction that, when executed by the one or more processors, cause the data processing apparatus to:
obtain a target data table comprising at least two index keywords corresponding to a target object;
merge metadata information corresponding to the at least two index keywords in the target data table to obtain a metadata management table; and
perform feature mapping on data in the target data table according to the metadata management table to obtain data features corresponding to the at least two index keywords in the target data table, and generate data feature tables;
merge the data feature tables to obtain an index table to correspondingly store the target object and a data feature corresponding to the target object, wherein merging the data feature tables comprises:
in response to that the data feature tables comprise wide table features, horizontally splicing the wide table features corresponding to the at least two index keywords to obtain a wide table;
in response to that the data feature tables comprise vertical table features, sequentially writing value range fields in the vertical table features corresponding to the at least two index keywords in a value range storage, and sequentially writing field setting values in the vertical table features in a field storage to obtain a vertical table; and
merging the wide table and the vertical table to obtain the index table.

13. The apparatus according to claim 12, wherein the instructions, when executed by the one or more processors, cause the data processing apparatus to:
determine basic metadata information corresponding to the at least two index keywords in the target data table to obtain a basic field information table; and
generate other metadata information tables according to the at least two index keywords in the target data table with the basic field information table as a core to obtain the metadata management table, wherein the other metadata information tables are used for indicating index related information corresponding to the at least two index keywords.

14. The apparatus according to claim 13, wherein instructions, when executed by the one or more processors, cause the data processing apparatus to:
generate a data theme table corresponding to the at least two index keywords with the basic field information table as the core; and
link a theme field foreign key in the basic field information table to the data theme table, wherein the data theme table is used for indicating a theme relationship corresponding to the at least two index keywords;
or
generate a metadata information table corresponding to the at least two index keywords with the basic field information table as the core; and
link a table field foreign key in the basic field information table to the metadata information table, wherein the metadata information table is used for indicating the metadata information corresponding to the at least two index keywords;
or
generate a metadata information management table corresponding to the at least two index keywords with the basic field information table as the core; and
link a data type field foreign key in the basic field information table to the metadata information management table, wherein the metadata information management table comprises a data type and a value range corresponding to each of the at least two index keywords.

15. A non-transitory computer-readable storage medium, storing instructions that, when executed, cause:
obtaining a target data table comprising at least two index keywords corresponding to a target object;
merging metadata information corresponding to the at least two index keywords in the target data table to obtain a metadata management table;
performing feature mapping on data in the target data table according to the metadata management table to obtain data features corresponding to the at least two index keywords in the target data table and to generate data feature tables; and
merging the data feature tables to obtain an index table to correspondingly store the target object and a data feature corresponding to the target object, wherein the merging the data feature tables comprises:
in response to that the data feature tables comprise wide table features, horizontally splicing the wide table features corresponding to the at least two index keywords to obtain a wide table;
in response to that the data feature tables comprise vertical table features, sequentially writing value range fields in the vertical table features corresponding to the at least two index keywords in a value range storage, and sequentially writing field setting values in the vertical table features in a field storage to obtain a vertical table; and
merging the wide table and the vertical table to obtain the index table.

16. The non-transitory computer-readable storage medium of claim 15, wherein the instructions, when executed, cause merging metadata information corresponding to the at least two index keywords in the target data table to obtain a metadata management table by causing:
determining basic metadata information corresponding to the at least two index keywords in the target data table to obtain a basic field information table; and
generating other metadata information tables according to the at least two index keywords in the target data table with the basic field information table as a core to obtain the metadata management table, and wherein the other metadata information tables are used for indicating index related information corresponding to the at least two index keywords.

17. The non-transitory computer-readable storage medium of claim 16, wherein the instructions, when executed, cause the generating other metadata information tables according to the at least two index keywords in the target data table by causing:
- generating a data theme table corresponding to the at least two index keywords with the basic field information table as the core; and
- linking a theme field foreign key in the basic field information table to the data theme table, wherein the data theme table is used for indicating a theme relationship corresponding to the at least two index keywords.

18. The non-transitory computer-readable storage medium of claim 15, wherein the target data table comprises classification data corresponding to the at least two index keywords; and wherein the instructions, when executed, cause the performing feature mapping by causing:
- mapping the classification data in the target data table to value ranges corresponding to classification types according to the metadata management table, to obtain feature values corresponding to the classification data as the data features.

19. The non-transitory computer-readable storage medium of claim 15, wherein the target data table comprises location service data corresponding to the at least two index keywords; and wherein the instructions, when executed, cause the performing feature mapping by causing:
- dividing preset map data into n grids according to the metadata management table, wherein n is a positive integer;
- labeling then grids with corresponding grid identifiers; and
- mapping the location service data into the grids, to obtain grid identifiers of the location service data as the data features.

20. The non-transitory computer-readable storage medium of claim 15, wherein the instructions, when executed, further cause:
- receiving an index request, wherein the index request comprises a keyword requirement corresponding to the at least two index keywords;
- obtaining an object whose data feature meets the keyword requirement from the index table as an index result; and
- returning the index result.

* * * * *